United States Patent
Lawrence et al.

(10) Patent No.: US 11,463,255 B2
(45) Date of Patent: Oct. 4, 2022

(54) DOCUMENT VERIFICATION SYSTEM

(71) Applicant: Bank of America Corporation, Charlotte, NC (US)

(72) Inventors: Patrick N. Lawrence, Plano, TX (US); Tulasi Bhavani Nekkanti, Hyderabad (IN); Rajeev Kolappapillai, Chennai (IN); Sunil Bhashetty, Hyderabad (IN)

(73) Assignee: Bank of America Corporation, Charlotte, NC (US)

( * ) Notice: Subject to any disclaimer, the term of this patent is extended or adjusted under 35 U.S.C. 154(b) by 173 days.

(21) Appl. No.: 17/141,064

(22) Filed: Jan. 4, 2021

(65) Prior Publication Data

US 2022/0216993 A1 Jul. 7, 2022

(51) Int. Cl.
*H04L 9/32* (2006.01)
*G06F 21/64* (2013.01)

(52) U.S. Cl.
CPC .............. *H04L 9/32* (2013.01); *G06F 21/64* (2013.01)

(58) Field of Classification Search
CPC .................................. H04L 9/32; G06F 21/64
See application file for complete search history.

(56) References Cited

U.S. PATENT DOCUMENTS

| | | | |
|---|---|---|---|
| 5,991,733 A | 11/1999 | Aleia et al. | |
| 6,243,722 B1 | 6/2001 | Day et al. | |
| 6,343,275 B1 | 1/2002 | Wong | |
| 6,796,486 B2 | 9/2004 | Ohashi | |
| 6,915,265 B1 | 7/2005 | Johnson | |
| 7,107,518 B2 | 9/2006 | Ramaley et al. | |
| 8,108,274 B2 | 1/2012 | Johnston et al. | |
| 8,165,974 B2 | 4/2012 | Privault et al. | |
| 8,401,896 B2 | 3/2013 | Wargin et al. | |
| 8,413,074 B2 | 4/2013 | Stevens | |
| 8,612,446 B2 | 12/2013 | Knight et al. | |
| 8,645,168 B2 | 2/2014 | Schmidt et al. | |
| 8,706,810 B2 | 4/2014 | Vishnubhatla et al. | |
| 8,972,845 B2 | 3/2015 | Wu | |
| 9,344,390 B1 | 5/2016 | Chandrasekar et al. | |
| 9,383,888 B2 | 7/2016 | Fish et al. | |
| 9,489,446 B2 | 11/2016 | Knight et al. | |
| 9,870,591 B2 | 1/2018 | Shah | |
| 10,261,953 B2 | 4/2019 | Richardson et al. | |
| 10,354,203 B1 | 7/2019 | Carr et al. | |
| 10,354,227 B2 | 7/2019 | Goel et al. | |
| 10,394,937 B2 | 8/2019 | Fein et al. | |
| 10,430,903 B2 | 10/2019 | Wu | |
| 10,504,037 B1 | 12/2019 | Anant et al. | |
| 10,572,946 B2 | 2/2020 | Bowles et al. | |
| 10,586,178 B1 | 3/2020 | Carr et al. | |
| 10,620,783 B2 | 4/2020 | Beckley et al. | |

(Continued)

*Primary Examiner* — Abiy Getachew

(57) ABSTRACT

A device receives a document that includes a request and supporting data associated with the request. The device determines that the received request is a first request type. A first set of supporting data is determined that is needed to determine a verification status for requests of the first request type. Based on a comparison of the received supporting data to the first set of supporting data, the device determines that the supporting data includes the data needed to determine the verification status for requests of the first request type. The device then extracts document data from the received document. The extracted document data is compared to the supporting data. Based on this comparison, a verification status is determined for the request.

20 Claims, 4 Drawing Sheets

(56) References Cited

U.S. PATENT DOCUMENTS

| | | |
|---|---|---|
| 10,620,784 B2 | 4/2020 | Beckley et al. |
| 10,650,010 B2 | 5/2020 | Richardson et al. |
| 2015/0106132 A1 | 4/2015 | Johnson et al. |
| 2017/0199848 A1 | 7/2017 | Fein et al. |
| 2017/0205965 A1 | 7/2017 | Goel et al. |
| 2018/0203921 A1 | 7/2018 | Privault et al. |
| 2018/0253297 A1 | 9/2018 | Richardson et al. |
| 2019/0121840 A1 | 4/2019 | Abbott et al. |
| 2019/0205306 A1 | 7/2019 | Richardson et al. |
| 2019/0205400 A1 | 7/2019 | Puzicha |
| 2019/0236491 A1 | 8/2019 | Carr et al. |
| 2020/0143107 A1 | 5/2020 | Trese et al. |
| 2020/0265056 A1 | 8/2020 | Richardson et al. |
| 2020/0293518 A1 | 9/2020 | Greetham |
| 2020/0293577 A1 | 9/2020 | Greetham |
| 2020/0311191 A1 | 10/2020 | Sekine |

DOCUMENT VERIFICATION SYSTEM

TECHNICAL FIELD

The present disclosure relates generally to data security and verification, more specifically to a document verification system.

BACKGROUND

Documents may include information for requested actions to be taken by an entity, such as an individual, company, government agency, or the like. For example, a document may include a request to update user profile information, to transfer funds, or the like. Document review and data verification may be performed before requested actions are taken to prevent unauthorized actions from being taken.

SUMMARY

In one embodiment, a system includes a document verification device with a memory and a processor. The a memory stores request-mapping data that includes an indication of supporting data needed to proceed with verification of requests of different request types. The device receives a document that includes a request. The request corresponds to an action requested by a user. Supporting data associated with the request is also received. The device determines that the received request is a first request type. Based on the request-mapping data, a first set of supporting data is determined that is needed to determine a verification status for requests of the first request type. Based on a comparison of the received supporting data to the first set of supporting data, the device determines that the supporting data includes the data needed to determine the verification status for requests of the first request type. After determining that the supporting data includes the data needed to determine the verification status for requests of the first request type, the device extracts document data from the received document. The extracted document data is compared to the supporting data. Based on the comparison of the extracted document data to the supporting data, a verification status is determined for the request. A status report indicating the determined verification status of the request is provided by the device.

Documents that indicate a request generally should be reviewed, and the request should be verified before a requested action is taken. Previous technology for request verification may be inefficient and unreliable. Generally, previous document review technology requires extensive manual review by individuals, and verification results from previous technology can be unreliable, such that the requests are sometimes verified when they should not be and/or incorrect actions are taken. In some cases, thousands or more of documents may be received for verification in a given day. The slow rate of verification possible using previous technology results in a bottleneck, and, in some cases, actions requested by these documents cannot be taken within an appropriate time period, resulting in failure to provide requested services or actions in a timely manner.

Certain embodiments of this disclosure solve the problems associated with document verification described above as well as other technical problems of previous technology by automatically reviewing document-based requests to determine if they are valid and whether an associated requested action should be performed. For example, the disclosed system provides several technical advantages over previous technology, which include: (1) autonomously reviewing incoming document data to determine that document-specific prerequisites are satisfied before processing resources are expended to perform further verification tasks; (2) reliably comparing incoming document data to baseline data (e.g., from supporting documentation) such that discrepancies are reliably detected for document verification; and (3) automatically alerting users and individuals responsible for further actionable tasks of the outcome of document verification, such that appropriate action can be undertaken promptly. As such, this disclosure may improve the function of computer systems used to perform document and/or request verification. The document verification system described in this disclosure may ensure documents are reviewed in a timely manner, thereby reducing or eliminating bottlenecks imposed by previous technology. This disclosure may particularly be integrated into a practical application of a document review system, which receives incoming electronic documents requesting action(s) along with supporting documentation or data, automatically reviews the received information to determine if necessary verification information is present, and performs verification by comparing the information in the request document to the supporting data. The rapid verification of documents, which is uniquely facilitated by this disclosure, may be particularly beneficial for entities receiving large numbers of request documents in a short time period, such that verified requested actions can be performed within a predefined time frame (e.g., defined by statute or to improve user experience). The document verification device of this disclosure may also reliably prevent unauthorized actions from being taken, which may otherwise result in a lapse in information security, improper transfer of funds, or the like.

Certain embodiments of this disclosure may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

As described above, previous technology lacks tools for efficiently and reliably verifying information presented in documents. This disclosure solves problems of previous technology and provides associated technological advantages. For example, the document verification system described in this disclosure may autonomously review incoming document data and determine whether document-specific prerequisites are satisfied (e.g., whether appropriate supporting data was received) before processing resources are expended to perform further verification tasks. The document verification system also compares incoming document data to supporting data such that discrepancies are reliably detected for document verification. To improve the reliability and efficiency of this data comparison, a set of data comparison rules may be implemented that reduce the need for supplemental review by a human. The document verification system automatically alerts users and individuals responsible for further actionable tasks of the outcome of the document verification, such that appropriate action can be promptly undertaken. Thus, the document verification system may prevent or remove bottlenecks in request-review pipelines in which documents generally were not reviewed fast enough using previous technology in order for appropriate action to be taken in a reduced amount of time. This frees up computing resources to be allocated to other activities.

Document and Request Verification System

Figure 1:
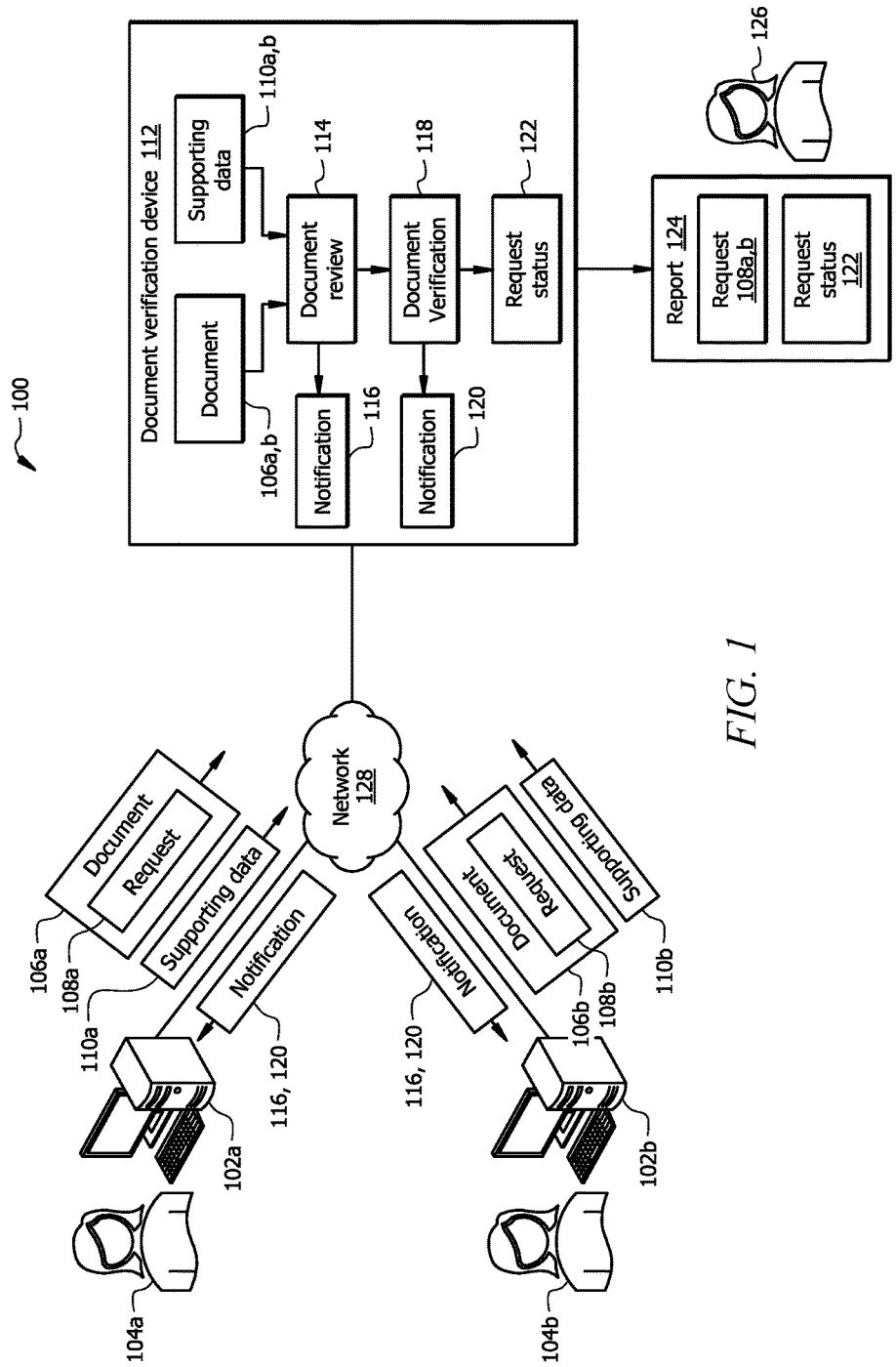
FIG. 1 is a schematic diagram of an example system configured for document verification.

FIG. 1 is a schematic diagram of an example system 100 for document verification. The system 100 includes user devices 102a,b, document verification device 112, and network 128. The document verification device 112 is generally configured to automatically review documents 106a,b that include requests 108a,b for services and determine whether the requests 108a,b are verified and requested services should be provided to the requesting user 104a,b. For example, the document verification device 112 may determine whether a transaction or any other service should be allowed for a requesting user 104a,b. If necessary supporting data 110a,b used for verification is not provided, the verification device 112 may send a notification 116 requesting the missing data 110a,b. If document verification 118 fails, a notification 120 may be provided to inform the user 104a,b. For example, the user 104a,b may provide an updated document 106a,b to provide any missing information needed to verify the request 108a,b. The document verification device 112 and its operation are described in greater detail below.

Figure 3:
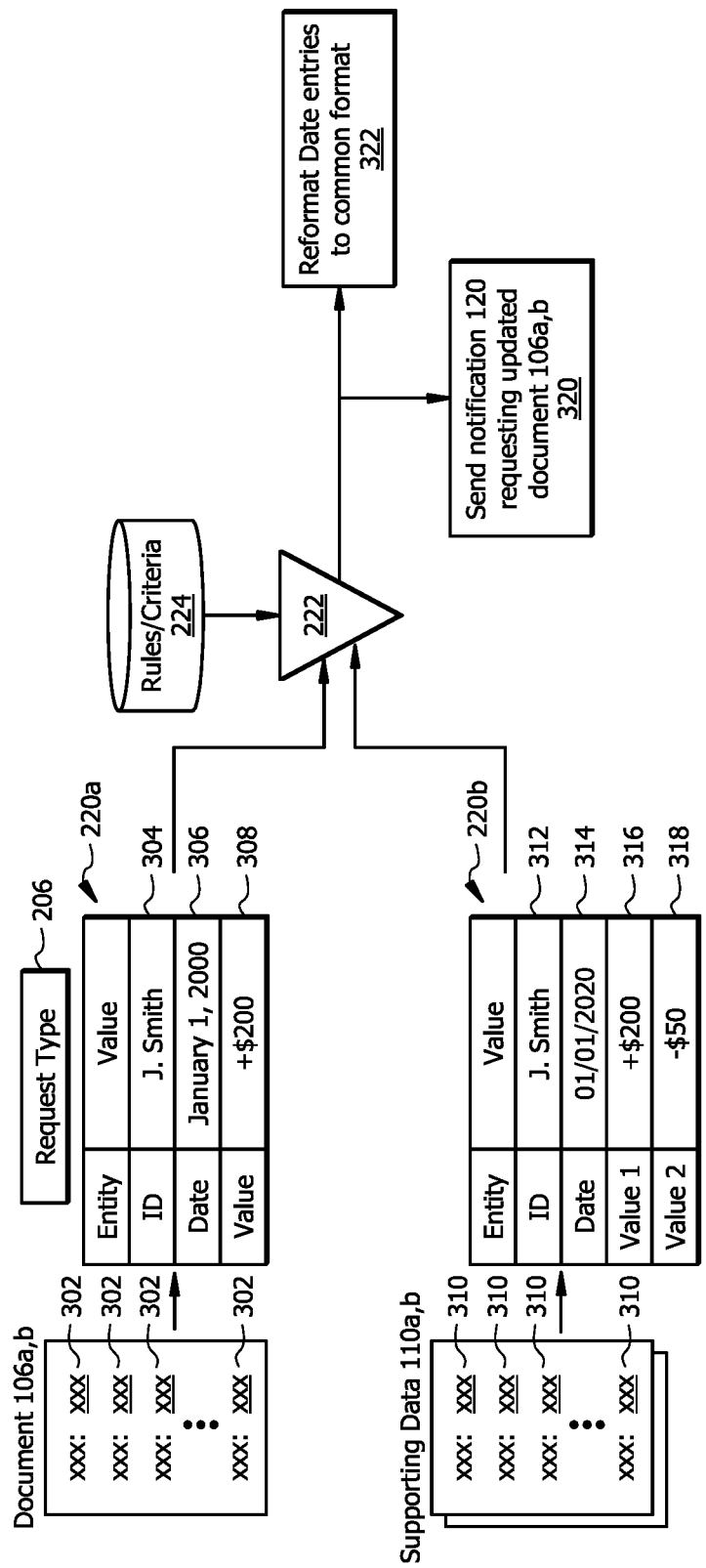
FIG. 3 is a flow diagram illustrating use of the data comparison rules and verification criteria of FIG. 2.

The user device 102a,b may be any appropriate device for generating a document 106a,b based on input from a user 104a,b. For example, a user device 102a,b may be a personal computer or a mobile device operated by the user 104a,b. Each user device 102a,b may include the processor, memory, and/or interface of the device 400 described below with respect to FIG. 4. A user device 102a,b is configured to generate, or provide information for generating, a document 106a,b which includes one or more requests 108a,b. For example, a document 106a,b may be a predefined form with entries completed in order for the user 104a,b to make a corresponding type of request 108a,b. An example document 106a,b is illustrated in FIG. 3 and described in greater detail below. Examples of requests 108a,b include requests for a transaction of goods or services, such as for a financial transaction or the like.

The user device 102a,b may also communicate supporting data 110a,b. The supporting data 110a,b may be any information provided by the user 104a,b to provide evidence that a request 108a,b is appropriate. For example, if a request 108a,b is for a reimbursement of money, the supporting data may be a receipt for a transaction associated with the requested reimbursement. For example, supporting data 110a,b may be, or may be determined from, one or more documents that include information which is used by the document verification device 112 for document verification 118. The user device 102a,b may provide copies of documents which include supporting data 110a,b (e.g., as indicated by the user 104a,b) or may provide appropriate information (e.g., a web address, a document or data identifier) for the supporting data 110a,b to be obtained or determined by the document verification device 112. As described in greater detail below, the document verification device 112 determines a request status for request 108a,b based on a comparison of information included in the user-provided request document 106a,b and the relevant supporting data 110a,b.

The document verification device 112 is generally any device or collection devices (e.g., a collection of devices implemented as a server, a virtual server, or the like) configured to receive document 106a,b and supporting data 110a,b and determine an appropriate request status 122 for request(s) 108a,b included in the document 106a,b. The document verification device 112 may be implemented using the processor, memory, and interface of the device 400 described below with respect to FIG. 4. As described in greater detail below with respect to FIGS. 2 and 3, the document verification device 112 receives a document 106a,b generated by a user device 102a,b and supporting data 110a,b associated with the request 108a,b.

The verification device 112 performs document review 114 in order to determine if the supporting data 110a,b is sufficient for proceeding with verification of the document 106a,b and request 108a,b. During document review 114, the document verification device 112 determines what supporting data 110a,b is needed to determine a request status 122 for the request 108a,b included in the document 106a,b. If the needed supporting data 110a,b was not received, the document verification device 112 may provide a notification 116 indicating that additional supporting data 110a,b is needed. The notification 116 may indicate the missing supporting data 110a,b, such that the user 104a,b can readily provide the missing information.

Once all of the needed supporting data 110a,b is received, the verification device 112 proceeds to document verification 118. Document verification 118 involves a comparison of data extracted from the document 106a,b and the supporting data 110a,b, as described in greater detail with respect to FIGS. 2 and 3 below. In brief, the document verification device 112 may extract document data from the received document 106a,b and compare the extracted document data to the supporting data 110a,b. Based on this comparison, the verification status 122 for the request 108a,b is determined. For instance, if the data from the document 106a,b matches the supporting data 110a,b, the document 106a,b may be verified and the request status 122 may indicate that the request 108a,b is verified or approved.

The request status 122 may be provided in a report 124 for viewing by an administrator 126 (e.g., using the document verification device 112 or another computing device). The report 124 may include an indication of the request 108a,b and the request status 122, such that timely action may be taken by the administrator 126. For instance, if a request 108a,b corresponds to a transfer of funds to an account and the request status 122 indicates that the request 108a,b is verified, the administrator 126 may take actions to execute the transfer. Following receipt of the report 124, the administrator 126 may be able to provide a requested service for an approved request status 122 than was possible using previous technology or the administrator 126 may be able to perform further diligence for an indeterminate request status 122 without incurring delays for verification associated with previous technology. In some cases, the document verification device 112 may be configured to automatically implement actions for a verified request 108a,b (i.e., with a verified or approved request status 122). For example, a verified request 108a,b may be automatically performed, while only requests 108a,b that are unverified (e.g., that failed verification) and/or are partially verified (e.g., that require some review by the administrator 126 or further input from a user 104a,b) may be handled by the administrator 126.

Network 128 may include any interconnecting system capable of transmitting audio, video, signals, data, messages, or any combination of the preceding. Network 128 may include all or a portion of a public switched telephone network (PSTN), a public or private data network, a local area network (LAN), a metropolitan area network (MAN), a wide area network (WAN), a local, regional, or global communication or computer network, such as the Internet, a wireline or wireless network, an enterprise intranet, or any other suitable communication link, including combinations thereof, operable to facilitate communication between the user devices 102a,b and the document verification device 112.

In an example operation of the system 100, a user 104a,b submits a document 106a,b with a request 108a,b for review. The user 104a,b also provides supporting data 110a,b that he/she believes is needed to verify that the request 108a,b should be verified or approved. In this example, the document verification device 112 receives the document 106a,b and the supporting data 110a,b. The document verification device 112 performs document review 114 and determines that supporting data 110a,b is missing that is needed to proceed with document verification 114. The document verification device 112 provides a notification 116 indicating the missing supporting data 110a,b that should be provided.

Following receipt of the missing supporting data 110a,b, the document verification device 112 proceeds to document verification 118. During document verification 118, the document verification device 112 extracts data from the document 106a,b and compares this data to the supporting data 110a,b. The document verification device 112 may adjust the data from the document 106a,b and/or the supporting data to facilitate this comparison, for example, by adjusting the format of certain data entries to a common entry format. For example, dates, names, amounts of money, and the like may be presented in a corresponding common format. For instance, all dates may be adjusted to a common "DAY/MONTH/YEAR" format to facilitate comparison. Names may be adjusted to a "LAST NAME, FIRST NAME" format to facilitate data comparison. In this example operation, the data verification device 112 identifies evidence that information was excluded from the request document 106a,b and provides a notification 120 indicating that an updated document 106a,b should be provided. For instance, the document verification device 112 may determine that a data entry is present in the supporting data 110a,b, while a corresponding entry is absent in the data from the document 106a,b (see the example of FIG. 3 described below for further illustration of such a scenario).

After the updated document 106a,b is received, the document verification device 112 completes document verification 118 and determines the request status 122. If the request status 122 indicates that the request 106a,b is verified, the document verification device 112 may automatically perform a task associated with the request 108a,b. For instance, if the request 108a,b was a request for a transfer of funds, the transfer may be processed automatically. If the request status 122 indicates that the request 108a,b is partially approved (e.g., that further human review is needed) or denied, this information may be included in the notification 120. If the request status 122 indicates that the request 108a,b is partially approved, the report 124 allows an administrator to efficiently review the request 108a,b and take further action to finalize the verification process in a prompt and efficient manner.

Example Methods of Operation

Figure 2:
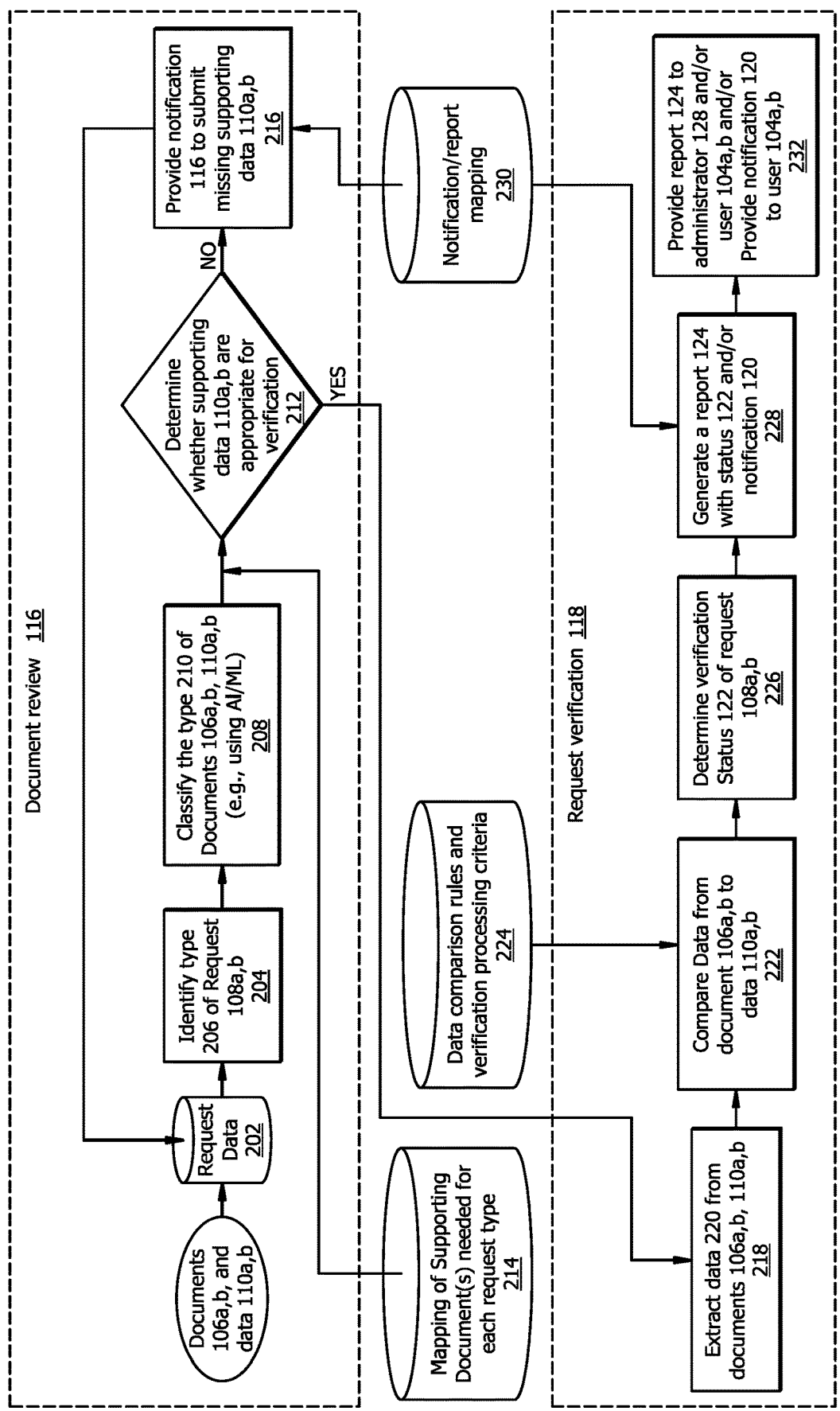
FIG. 2 is a flow diagram illustrating example operation of the system of FIG. 1.

FIG. 2 is a flow diagram 200 illustrating an example operation of the document verification device 112 of FIG. 1 in greater detail. As shown in FIG. 2, document review 116 begins with receipt of documents 106a,b and supporting data 110a,b. The received documents 106a,b and/or supporting data 110a,b may be stored in a repository 202 of request data, which includes the documents 106a,b and supporting data 110a,b. At operation 204, a request type 206 is determined for the request 108a,b of the received document 106a,b. An example of the determination of a request type 206 is illustrated in the flow diagram 300 of FIG. 3. As shown in FIG. 3 an example document 106a,b includes a number of entries 302. At least one of the entries 302 includes information for identifying the type 206 of the request 108a,b. For example, at least one entry 302 may identify the request type 206 (e.g., based on a title of the document 106a,b and/or any other text appearing in the document 106a,b). The document verification device 112 determines the request type 206 based on this entry 302 in the document 106a,b. For example, the document verification device 112 may use any appropriate method of natural language processing to identify keywords and/or phrases in the entry 302 and determine the request type 206 based on the identified keywords and/or phrases. For example, identification of the keyword "REIMBURSEMENT" in a title field entry 302 of a document 106a,b may cause the document verification device 112 to determine that the request type 206 is a reimbursement request. In some cases, the user 104a,b may provide a more direct indication of the request type 206 (e.g., by selecting from a list of possible request types 304 when the document 106a,b is generated and/or provided to the document verification device 112).

Returning to FIG. 2, at operation 208, the document verification device 112 classifies the type 210 of the document 106a,b and supporting data 110a,b. For example, the document 106a,b may be classified, at least in part, based on the request type 206 determined at operation 204. The supporting data 110a,b may be classified based on the information included in the supporting data 110a,b. For instance, supporting data 110a,b that is a receipt for a transaction may be classified as a receipt type 210. As another example, supporting data 110a,b that is a pay stub may be classified as a payment type 210. In some cases, an artificial intelligence or machine learning algorithm may be trained to classify documents 106a,b and/or supporting data 110a,b into these predefined types 210 or groups.

At operation 212, the document verification device 112 determines whether the supporting data 110a,b is sufficient to verify the request 108a,b included in the received document 106a,b. A mapping 214 of supporting data 110a,b to request type 206 may be used for the determination at operation 212. The mapping 214 includes, for each request type 206, a corresponding set of types 210 of supporting data 110a,b that are needed to proceed with verification of the request type 206. The mapping 214 may be a stored in one or more databases, data tables, or the like. If the document verification device 112 determines that the required supporting data 110a,b is not available, the data verification device 112 proceeds to operation 216 where notification 116 is provided to request the missing supporting data 110a,b (see also FIG. 1 and corresponding description above). Notification 116 may be generated, using notification/report mapping 230, to include instructions in a natural language for providing the missing supporting data 110a,b. The notification/report mapping 230 includes, for each type of supporting data 110a,b, corresponding text for requesting the type of supporting data 110a,b. For instance, for cases where a receipt document is missing from the supporting data 110a,b, the notification/report mapping 230 includes text in a natural language for requesting the missing receipt. As another example, for cases where a transaction date is missing from the supporting data 110a,b, the notification/report mapping 230 includes text in a natural language for requesting the missing transaction date. Otherwise, if the required supporting data 110a,b is available, the document verification device 112 proceeds to operations 218-232 to perform request verification 118.

Request verification 118 may begin at operation 218 where data 220 is extracted from the document 106a,b and, if needed, the supporting data 110a,b. An example of the extraction of data 220 is illustrated in the flow diagram 300 of FIG. 3. As shown in FIG. 3, an example document 106a,b includes entries 302, which include information for extracting relevant document data 220a for validating the request 108a,b. For example, a name or user identification entry 304 of data 220a may be determined based on a corresponding entry 302 in the document 106a,b that indicated a name or user identification associated with the request 108a,b. Similarly, a date entry 306 of data 220a may be determined based on an entry 302 in the document 106a,b that indicated a date (e.g., of a request 108a,b), and a value entry 308 in the data 220a may be determined from an entry 302 in the document 106a,b that indicates an amount (e.g., of product, funds, or the like) associated with the request 108a,b. While the example data 220a includes an value entry 308 that is an amount of money, it should be understood that the value entry 308 may be any amount or value that is associated with a request 108a,b. The document verification device 112 may use any appropriate method of natural language processing to identify keywords and/or phrases in the document for the determination of entries 302 and determine data entries 304, 306, 308 from the entries 302 in the document 106a,b.

If needed, data 220b may be extracted from the supporting data 110a,b using the same or a similar approach to that described above for the extraction of data 220a from document 106a,b. In some cases, the supporting data 110a,b is received in a form that does not require extraction. If the supporting data 110a,b includes a document such as a report, a receipt, or some other document, extraction of corresponding supporting data 220b is generally needed. Similar to the document 106a,b, described above, a supporting data 110a,b that is a document may include entries 310 that are similar to entries 302, described above. In this example, a name or user identification entry 312 of data 220b may be determined based on a corresponding entry 310 in the supporting data 110a,b that indicated a name or user identification. Similarly, a date entry 314 of data 220b may be determined based on an entry 310 in the supporting data 110a,b that indicated a date (e.g., of a transaction or the like associated with the request 108a,b), and value entries 316, 318 in the data 220b may be determined from corresponding entries 310 in the supporting data 110a,b that indicate amounts (e.g., of products, funds, or the like) associated with the request 108a,b. As is described further below, an additional value entry 318 is identified in the supporting data 110a,b. In this case, the document verification device 112 may request an updated document 106a,b to reconcile the difference in the number of amount entries 308 in data 220a and entries 316, 318 in data 220b (e.g., by sending a notification 120).

Returning to FIG. 2, at operation 222 the data 220 extracted from the document 106a,b (e.g., extracted data 222a of FIG. 3) is compared to the supporting data 110a,b (e.g., data 220b of FIG. 3). In some embodiments, prior to comparing data 220 and 110a,b, the document verification device 112 may employ data comparison rules and verification processing criteria 224 to ensure that the results of the comparison (e.g., the request status 122) will be as reliable as possible. For example, criteria 224 may indicate that for certain entries in the supporting data 110a,b (e.g., entries 312, 314, 316, 318 of FIG. 3), the document data 220 must include a corresponding entry. For example, if supporting data 110a,b shows evidence of a value (e.g., associated with a possible unreported transaction) that is not indicated in the user-provided document 106a,b, the document verification device 112 may provide a notification 120 indicating the missing value. FIG. 3 illustrates an example of such a scenario in which the document data 220a lacks a corresponding entry for the value entry 318 of the supporting data 220b. For example, the value entry 318 may indicate a possible exchange of $50 that is not reported in the document data 220a. To reconcile this apparent inconsistency, the document verification device 112 may send a notification 120 at operation 322 requesting an updated document 106a,b. The updated document 106a,b may be received and document review 118 may be performed, as described above.

Returning to FIG. 2, the rules and criteria 224 may also or alternatively include rules or instructions for modifying the extracted data 220 and/or supporting 110a,b to facilitate reliable comparison of the document data 220 (e.g., data 220a of FIG. 3) to the supporting data 110a,b (e.g., data 220b of FIG. 3). For example, the document verification device 112 may automatically reformat certain entries to facilitate reliable comparison of these entries. For instance, names, dates, amounts of money, and the like may each be adjusted to a common format to facilitate reliable comparison of such entries. FIG. 3 illustrates an example use of the rules and criteria 224 to reformat date entries 306 and/or 314 at operation 322. The document verification device 112 may automatically adjust all entries of certain types or may reformat entries that do not match between document data 220a and supporting data 220b.

Returning to FIG. 2, at operation 226, the document verification device 112 determines, based on the comparison from operation 222, a verification status 122 of the request 108a,b included in the received document 106a,b. For example, if all entries in the document data match corresponding entries in the supporting data 110a,b, a verified request status 122 may be determined. As another example, if greater than a threshold number of the entries of the document data 220 match corresponding entries in the supporting data, a partially verified request status 122 may be determined. A partially verified status 122 indicates further administrator review and/or further information from user 104a,b may be required. If less than a threshold number of the entries of the document data 220 match corresponding entries in the supporting data, an unverified, or "failed verification," request status 122 may be determined. The verification status 122 generally includes an indication of whether the request 108a,b should be allowed (e.g., whether a requested service should be provided). The document verification device 112 may be configured to automatically implement actions for a verified request 108a,b (i.e., with as verified or approved request status 122). For example, a verified request 108a,b may be automatically performed, while only requests 108a,b that are unverified (e.g., that failed verification) and/or are partially verified (e.g., that require some review by the administrator 126 or further input from a user 104a,b) may be handled by the administrator 126.

At operation 228, the document verification device 112 generates a report 124 with the request status 122 from operation 226. The report 124 may be generated using the notification/report mapping 230. The notification/report mapping 230 includes instructions for generating text in a natural language that a user 104a,b or administrator 126 can understand to interpret the request status 122 and/or identify any actions to take in response to the request status 122. The notification 120 may indicate the request status and include text generated using the notification/report mapping 230 for the user 104a,b to understand the request status 122 and identify any other actions which should be taken by the user 104a,b. For example, if a notification 120 indicates an updated document 106a,b is needed, the notification/report mapping 230 may be used to generate text in a natural language which indicates an apparent discrepancy identified during request verification 118 (see operation 320 of FIG. 3 and corresponding description above).

At operation 232, the document verification device 112 provides the report 124 to an administrator 126 and/or the notification 120 to the user 104a,b who provided the document 106a,b for verification. As described above with respect to FIG. 1, the report 124 may prompt an administrator 126 to perform an action associated with the request 108a,b (e.g., by providing some service).

Example Device for Implementing the Document Verification System

Figure 4:
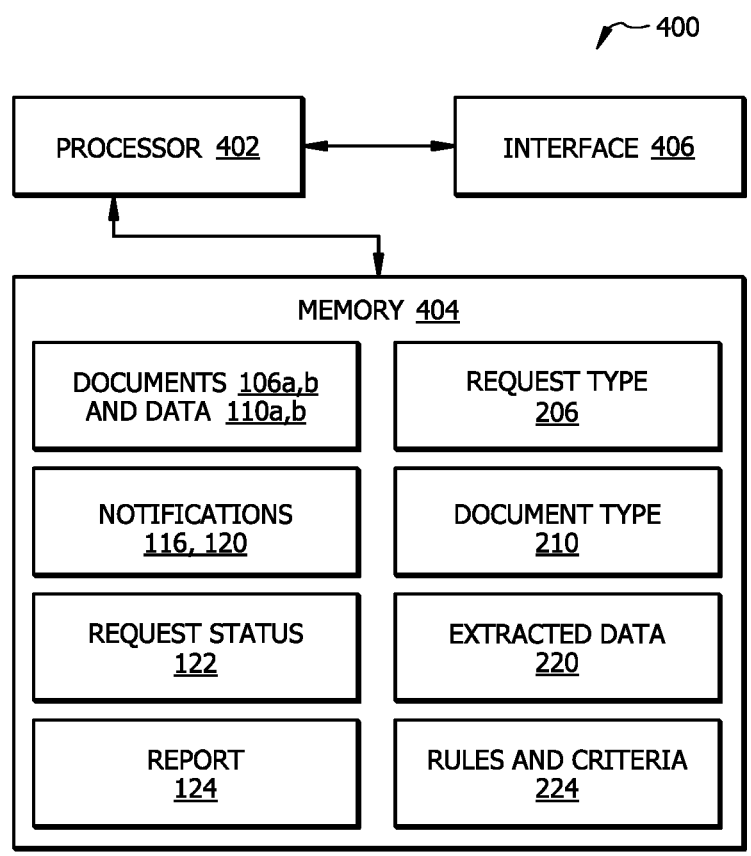
FIG. 4 is a diagram of an example device configured to implement various components of the system of FIG. 1.

FIG. 4 illustrates an embodiment of a device 400 configured to implement various components of the system 100. One or more devices 400 may be used to implement the user devices 102a,b and/or the document verification device 112 of FIG. 1. The device 400 includes a processor 402, a memory 404, and a network interface 406. The device 400 may be configured as shown or in any other suitable configuration.

The processor 402 comprises one or more processors operably coupled to the memory 404. The processor 402 is any electronic circuitry including, but not limited to, state machines, one or more central processing unit (CPU) chips, logic units, cores (e.g. a multi-core processor), field-programmable gate array (FPGAs), application specific integrated circuits (ASICs), or digital signal processors (DSPs). The processor 402 may be a programmable logic device, a microcontroller, a microprocessor, or any suitable combination of the preceding. The processor 402 is communicatively coupled to and in signal communication with the memory 404 and the network interface 406. The one or more processors are configured to process data and may be implemented in hardware or software. For example, the processor 402 may be 8-bit, 16-bit, 32-bit, 64-bit or of any other suitable architecture. The processor 402 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. The one or more processors are configured to implement various instructions. For example, the one or more processors are configured to execute instructions to implement the function disclosed herein, such as some or all of those described with respect to the flow diagrams of FIGS. 2 and 3. In some embodiments, the function described herein is implemented using logic units, FPGAs, ASICs, DSPs, or any other suitable hardware or electronic circuitry.

The memory 404 is operable to store any of the information described above with respect to FIGS. 1-3 along with any other data, instructions, logic, rules, or code operable to execute the function described herein. The memory 404 may be volatile or non-volatile and may comprise read-only memory (ROM), random-access memory (RAM), ternary content-addressable memory (TCAM), dynamic random-access memory (DRAM), and static random-access memory (SRAM).

The network interface 406 is configured to enable wired and/or wireless communications. The network interface 406 is configured to communicate data between the device 400 and other network devices, systems, or domain(s). For example, the network interface 406 may comprise a WIFI interface, a local area network (LAN) interface, a wide area network (WAN) interface, a modem, a switch, or a router. The processor 402 is configured to send and receive data using the network interface 406. The network interface 406 may be configured to use any suitable type of communication protocol as would be appreciated by one of ordinary skill in the art.

While several embodiments have been provided in this disclosure, it should be understood that the disclosed systems and methods might be embodied in many other specific forms without departing from the spirit or scope of this disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of this disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

What is claimed is:

1. A system comprising:
   a user device configured to:
      receive user input associated with a request, wherein the request corresponds to an action requested by a user; and
      generate a document comprising the request;
   a document verification device comprising:
      a memory configured to store request-mapping data comprising an indication of supporting data needed to proceed with verification of requests of different request types; and
      a processor coupled to the memory and configured to:
         receive the document generated by the user device;
         receive supporting data associated with the request;

determine that the received request is a first request type;

determine, based on the request-mapping data, a first set of supporting data needed to determine a verification status for requests of the first request type;

determine, based on a comparison of the received supporting data to the first set of supporting data, that the supporting data includes the data needed to determine the verification status for requests of the first request type;

after determining that the supporting data includes the data needed to determine the verification status for requests of the first request type:
extract document data from the received document;
compare the extracted document data to the supporting data;
determine, based on the comparison of the extracted document data to the supporting data, a verification status of the request; and
provide a status report indicating the determined verification status of the request.

2. The system of claim 1, wherein the processor is further configured to:
determine, based on comparing the received supporting data to the first set of supporting data needed to determine a verification status for requests of the first request type, that additional supporting data is needed to proceed with verification of the request; and
in response to determining the additional supporting data is needed, provide a notification to the user device requesting the additional supporting data.

3. The system of claim 2, wherein:
the memory is further configured to store, for each type of supporting data, corresponding text for requesting the type of supporting data; and
the processor is further configured to:
determine a type of the additional supporting data that is needed to proceed with verification of the request; and
generate the notification using the corresponding text for the determined type of the additional supporting data that is needed to proceed with verification of the request.

4. The system of claim 1, wherein the processor is further configured to, prior to comparing the extracted document data to the supporting data, determine that verification-processing criteria are satisfied for the extracted document data by determining that data entries in the extracted document data and the supporting data are in a shared format.

5. The system of claim 4, wherein:
the memory is further configured to store rules for converting entries in one or both of the extracted document data and the supporting data from an initial format to the shared format; and
the processor is further configured to:
make an initial determination that the verification-processing criteria are not satisfied because a first entry in the extracted data and a second entry in the supporting data are not in the shared format;
following the initial determination that the verification-processing criteria are not satisfied:
adjust, using the stored rules, one or both of the first entry and the second entry, such that the first entry and the second entry are in the shared format; and
after adjusting one or both of the first entry and the second entry, determine that the verification-processing criteria are satisfied for the extracted document data.

6. The system of claim 1, wherein the processor is further configured to:
make an initial determination that verification-processing criteria are not satisfied because a first entry in the extracted data comprises a data type that does not match a data type of a corresponding second entry in the supporting data; and
following the initial determination that the verification-processing criteria are not satisfied, provide a request for an updated document with a corresponding updated request.

7. The system of claim 1, wherein the status report, for a verified request, prompts an administrator to perform the action requested by the user.

8. A method, the method comprising, by a processor:
receiving a document comprising a request, the request corresponding to an action requested by a user;
receiving supporting data associated with the request;
determining that the received request is a first request type;
determining, based on request-mapping data, a first set of supporting data needed to determine a verification status for requests of the first request type, wherein the request-mapping data comprises an indication of supporting data needed to proceed with verification of requests of different request types;
determining, based on a comparison of the received supporting data to the first set of supporting data, that the supporting data includes the data needed to determine the verification status for requests of the first request type;
after determining that the supporting data includes the data needed to determine the verification status for requests of the first request type:
extracting document data from the received document;
comparing the extracted document data to the supporting data;
determining, based on the comparison of the extracted document data to the supporting data, a verification status of the request; and
providing a status report indicating the determined verification status of the request.

9. The method of claim 8, further comprising:
determining, based on comparing the received supporting data to the first set of supporting data needed to determine a verification status for requests of the first request type, that additional supporting data is needed to proceed with verification of the request; and
in response to determining the additional supporting data is needed, providing a notification requesting the additional supporting data.

10. The method of claim 9, further comprising:
determining a type of the additional supporting data that is needed to proceed with verification of the request; and
generating the notification using text corresponding to the determined type of the additional supporting data that is needed to proceed with verification of the request.

11. The method of claim 8, further comprising, prior to comparing the extracted document data to the supporting data, determining that verification-processing criteria are satisfied for the extracted document data by determining that data entries in the extracted document data and the supporting data are in a shared format.

12. The method of claim 11, further comprising:
making an initial determination that the verification-processing criteria are not satisfied because a first entry in the extracted data and a second entry in the supporting data are not in the shared format;
following the initial determination that the verification-processing criteria are not satisfied:
adjusting one or both of the first entry and the second entry, such that the first entry and the second entry are in the shared format; and
after adjusting one or both of the first entry and the second entry, determining that the verification-processing criteria are satisfied for the extracted document data.

13. The method of claim 8, further comprising:
making an initial determination that the verification-processing criteria are not satisfied because a first entry in the extracted data comprises a data type that does not match a data type of a corresponding second entry in the supporting data; and
following the initial determination that the verification-processing criteria are not satisfied, providing a request for an updated document with a corresponding updated request.

14. The method of claim 8, wherein the status report, for a verified request, prompts an administrator to perform the action requested by the user.

15. A device comprising:
a memory configured to store request-mapping data comprising an indication of supporting data needed to proceed with verification of requests of different request types; and
a processor coupled to the memory and configured to:
receive a document comprising a request, the request corresponding to an action requested by a user;
receive supporting data associated with the request;
determine that the received request is a first request type;
determine, based on the request-mapping data, a first set of supporting data needed to determine a verification status for requests of the first request type;
determine, based on a comparison of the received supporting data to the first set of supporting data, that the supporting data includes the data needed to determine the verification status for requests of the first request type;
after determining that the supporting data includes the data needed to determine the verification status for requests of the first request type:
extract document data from the received document;
compare the extracted document data to the supporting data;
determine, based on the comparison of the extracted document data to the supporting data, a verification status of the request; and
provide a status report indicating the determined verification status of the request.

16. The device of claim 15, wherein the processor is further configured to:
determine, based on comparing the received supporting data to the first set of supporting data needed to determine a verification status for requests of the first request type, that additional supporting data is needed to proceed with further verification of the request; and
in response to determining the additional supporting data is needed, provide a notification to the user device requesting the additional supporting data.

17. The device of claim 16, wherein:
the memory is further configured to store, for each type of supporting data, corresponding text for requesting the type of supporting data; and
the processor is further configured to:
determine a type of the additional supporting data that is needed to proceed with verification of the request; and
generate the notification using the corresponding text for the determined type of the additional supporting data that is needed to proceed with verification of the request.

18. The device of claim 15, wherein the processor is further configured to, prior to comparing the extracted document data to the supporting data, determine that verification-processing criteria are satisfied for the extracted document data by determining that data entries in the extracted document data and the supporting data are in a shared format.

19. The device of claim 18, wherein:
the memory is further configured to store rules for converting entries in one or both of the extracted document data and the supporting data from an initial format to the shared format; and
the processor is further configured to:
make an initial determination that the verification-processing criteria are not satisfied because a first entry in the extracted data and a second entry in the supporting data are not in the shared format;
following the initial determination that the verification-processing criteria are not satisfied:
adjust, using the stored rules, one or both of the first entry and the second entry, such that the first entry and the second entry are in the shared format; and
after adjusting one or both of the first entry and the second entry, determine that the verification-processing criteria are satisfied for the extracted document data.

20. The device of claim 15, wherein the processor is further configured to:
make an initial determination that verification-processing criteria are not satisfied because a first entry in the extracted data comprises a data type that does not match a data type of a corresponding second entry in the supporting data; and
following the initial determination that the verification-processing criteria are not satisfied, provide a request for an updated document with a corresponding updated request.

* * * * *